May 12, 1942. W. H. JENNINGS 2,283,067
PROCESS FOR REFINING SULPHATE WOOD TURPENTINE
Filed Nov. 2, 1939
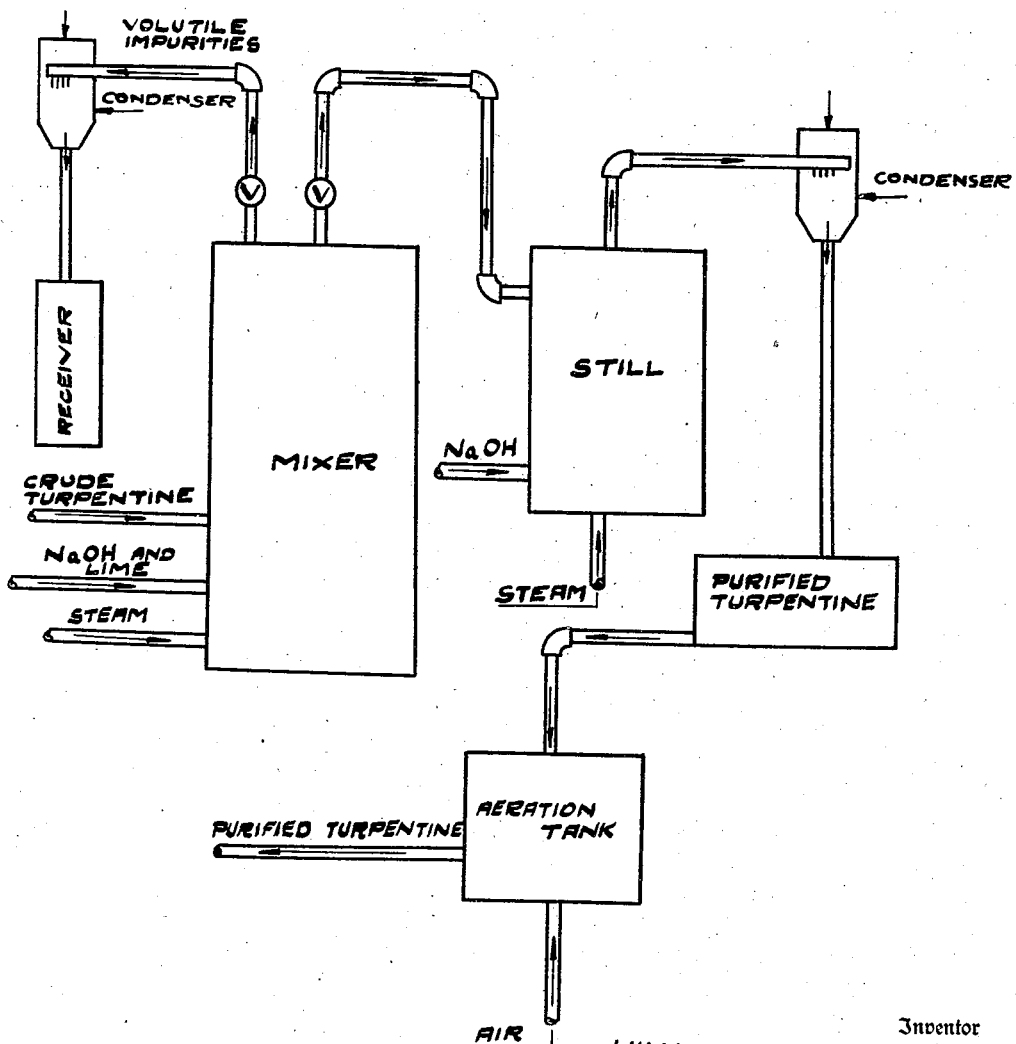
Inventor
WILLIAM H. JENNINGS
By
his Attorney Patented May 12, 1942

2,283,067

UNITED STATES PATENT OFFICE 2,283,067

PROCESS FOR REFINING SULPHATE WOOD TURPENTINE

William H. Jennings, Portsmouth, Va.

Application November 2, 1939, Serial No. 302,603

4 Claims. (Cl. 202—57)

This invention relates to a process for refining sulphate wood turpentine and has for its primary object the conversion of crude sulphate wood turpentine into a commercially practicable form.

Another object of the invention is to provide a process whereby the malodorous ingredients of the crude turpentine obtained as a by-product of the modification of the sulphate process, known as the kraft process, for preparing wood pulp from pine wood containing turpentine which formerly rendered the turpentine unusable, can be effectively removed.

A further object of the invention is to provide an inexpensive and satisfactory process for commercially utilizing the sulphate wood turpentine obtained as a by-product of the kraft process, thereby preventing the pollution of the streams into which the turpentine has heretofore been diverted as waste.

To the attainment of the foregoing and other objects the invention preferably comprises the various process steps and materials to be hereinafter more fully described and particularly pointed out in the appended claims.

In the kraft process for preparing wood pulp, pine logs from which the bar has been removed are fed into a "hog" in which they are cut into small chips. These chips are placed in a digester and treated under elevated temperatures and pressures with a cooking liquor, one of the principal ingredients of which is sodium sulphide. During the digestion, the pressure is built up by the generation of steam and this is relieved after a period of time by "gassing" the digester. The steam thus drawn off carries with it the vapors of turpentine and the other volatile products which have been liberated from the chips. These vapors are passed through a condenser and the condensate is pumped into a settling tank where the water separates from the other condensed vapors and is then drawn off. The remaining condensate is known as crude sulphate wood turpentine.

Due to the presence of sodium sulphide in the cooking liquor, the crude turpentine contains a mixture of exceedingly malodorous organic sulphur compounds and other impurities in the form of acids and pine oils which are the reaction products of the chemicals in the digester with the wood chips. The offensive odor imparted by these impurities to the turpentine renders the latter commercially valueless, and because of the difficulties confronted in attempting to remove the impurities by known processes, has heretofore resulted in the discard of the turpentine as waste. By the process of this invention the malodorous impurities in the crude turpentine are effectively removed, and highly refined turpentine having a pleasing odor is produced.

On the appended drawing I have shown my process in diagrammatic flow sheet form.

In the present process the impurities are removed by subjecting the crude sulphate wood turpentine to a combination of refining and commercial treatment steps. The crude turpentine is placed in a mixing vessel which is fitted with means for vigorously agitating its contents and steam coils and to which is connected a fractionating column. To the turpentine are added a solution of caustic soda and a relatively small amount of lime. Agitation is then begun to thoroughly mix the contents of the still and facilitate the reaction between the caustic soda and lime and the impurities in the turpentine. At the same time heat is applied to the mixture by admitting steam from the steam pipes into the bottom of the mixing vessel. The heating is continued until the mixture attains a temperature above which a part of the turpentine will vaporize and be distilled with the steam. At that point the flow of steam into the mixer is so controlled as to maintain the temperature substantially constant throughout the mixing process. The temperature above which turpentine will be steam distilled, hereinafter referred to as the critical temperature, may vary depending upon the source of the pine logs. For the crude turpentine on which experiments were conducted in developing the present process it was usually found to be between ninety-four (94) and one hundred ten (110) degrees centigrade.

During the mixing operation the impurities having a boiling point with steam below that of turpentine will pass through the fractionating column into a condenser from which the condensate is piped into a receiver, the vapors so condensed containing a high percentage of impurities. The fractionating column is so constructed that the ingredients of the mixture which can be steam distilled only at temperatures above the critical temperature will condense in the column and return to the mixer.

Of the impurities remaining in the mixer with the turpentine those having slightly acidic properties will react with the caustic soda to form sodium salts, e. g., the mercaptans are converted into mercaptides. Some of the resultant sodium salts are very unstable but in the presence of lime react to form insoluble calcium salts which precipitate from the solution. In addition to removing impurities as precipitates, the lime also liberates sodium from the unstable sodium salts as free caustic soda. While the amounts of caustic soda and lime added to the mixer necessarily vary with the impurities present in the crude turpentine, a typical batch of two hundred and fifty (250) gallons of crude turpentine can be satisfactorily processed by the addition of fifty (50) gallons of a ten percent (10%) solution of caustic soda and five (5) pounds of lime.

When the mixing operation has progressed a sufficient length of time for most of the impurities to either be removed by steam distillation or react with caustic soda, usually about two hours, the steam is cut off and the agitator stopped. The contents of the mixer are then allowed to separate. The caustic solution, containing the reaction products of the caustic soda and lime with the impurities in the turpentine, settles to the bottom of the mixer, from whence it is drawn off.

After the adulterated caustic solution has been removed, fresh caustic soda is added to the turpentine in the mixer, about ten (10) gallons of a ten percent (10%) solution being sufficient for the original two hundred and fifty (250) gallons of crude turpentine which have heretofore been mentioned. Heat is again applied to the mixer, preferably by the introduction of steam, and its contents heated to the critical temperature, in the course of which the volatile ingredients remaining from the first distillation will vaporize and pass off from the fractionating column. When the desired temperature has been attained the valve interposed between the mixer and fractionating column is closed and a valve, connecting the mixer with a condenser leading to a still, is opened. Additional steam is then admitted to the mixer and the temperature is raised sufficiently to distill the turpentine from the mixer to the still in which sufficient caustic soda has been placed to react with any impurities not removed in the mixer. For the typical original batch, containing two hundred and fifty (250) gallons of crude turpentine, about five pounds of caustic are adequate.

On completion of the distillation of all the turpentine from the mixer to the still the valve leading to the mixer is closed and the still heated to the critical temperature. When this temperature has been reached steam is admitted to the bottom of the still and the resultant vaporized turpentine and steam are passed through a condenser. As the first portion of the condensate, usually about three gallons, may contain some impurities, it is returned to the mixer to be reprocessed. The balance of the turpentine and water is pumped to an aeration tank as it condenses. The distillation is continued until only around five gallons of liquor remain in the still. This residue contains a high percentage of pine oils which may be refined and sold, the refining of such oils constituting no part of the present invention.

The condensed turpentine and water are aerated in the aeration tank for as long a time as may be necessary to impart to the turpentine the pleasing odor required of commercial turpentine, ordinarily between three and six hours, the desired change being effected by the oxidation of a portion of the turpentine. The mixture is then allowed to settle until the turpentine and water separate, whereupon the turpentine is drawn off and pumped into storage tanks for future use.

From the above detailed description of the invention it will be apparent that there has been provided a novel process for the refining of crude sulphate wood turpentine whereby the crude turpentine, which was formerly discarded as waste, can be simply and inexpensively converted into commercially valuable turpentine. The only chemicals given in the exemplified form of the process are caustic soda and lime, but it should be understood that the invention is not limited thereto but is intended to include as well basic alkali compounds such as caustic potash, sodium and potassium carbonate and other equivalent chemicals. While caustic soda has heretofore been used in the refining of turpentine to neutralize organic acids and polymerize aldehydes and ketones, it has never been employed, insofar as I am aware, in the refining of sulphate wood turpentine.

Having thus described my invention what I claim is:

1. The process of refining sulphate wood turpentine containing sulphur compounds as an impurity which comprises heating the turpentine with an aqueous solution of caustic soda and lime without substantially vaporizing the turpentine itself to effect substantial removal of said impurities from the turpentine, separating the aqueous solution from the turpentine, and thereafter steam-distilling the turpentine and recovering a purified turpentine distillate.

2. The process of refining sulphate wood turpentine containing sulphur compounds as an impurity which comprises heating the turpentine with an aqueous solution of caustic soda and lime without substantially vaporizing the turpentine itself to effect substantial removal of said impurities from the turpentine, separating the aqueous solution from the turpentine, and thereafter steam-distilling the turpentine and aerating the steam-distilled turpentine to obtain a purified turpentine distillate.

3. The process of refining sulphate wood turpentine containing sulphur compounds as an impurity which comprises heating the turpentine with an aqueous solution of caustic soda and lime without substantially vaporizing the turpentine itself to effect substantial removal of said impurities from the turpentine, separating the aqueous solution from the turpentine, reheating the turpentine with an additional amount of caustic soda solution without substantially vaporizing the turpentine itself, then steam-distilling the turpentine and recovering a purified turpentine distillate.

4. The process of refining sulphate wood turpentine containing sulphur compounds as an impurity which comprises heating the turpentine with an aqueous solution of caustic soda and lime without substantially vaporizing the turpentine itself to effect substantial removal of the aqueous impurities from the turpentine, separating the aqueous solution from the turpentine, reheating the turpentine with an additional amount of caustic soda solution without substantially vaporizing the turpentine itself, then steam-distilling the turpentine, collecting the turpentine distillate, redistilling the turpentine with steam in the presence of caustic soda and aerating the thus treated turpentine and recovering a purified turpentine distillate.

WILLIAM H. JENNINGS.